(12) United States Patent
Osawa et al.

(10) Patent No.: US 10,036,315 B2
(45) Date of Patent: Jul. 31, 2018

(54) SENSOR ATTACHMENT STRUCTURE

(71) Applicant: Nidec Tosok Corporation, Zama-shi, Kanagawa (JP)

(72) Inventors: Tomoka Osawa, Zama (JP); Hironobu Wakabayashi, Zama (JP); Toshiaki Nakamura, Zama (JP); Hiroshi Tatsuta, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 15/657,517

(22) Filed: Jul. 24, 2017

(65) Prior Publication Data

US 2018/0023469 A1    Jan. 25, 2018

(30) Foreign Application Priority Data

Jul. 25, 2016 (JP) ................. 2016-145607

(51) Int. Cl.
| | |
|---|---|
| F02B 77/08 | (2006.01) |
| G01L 7/00 | (2006.01) |
| G01L 19/14 | (2006.01) |
| F04C 29/00 | (2006.01) |
| F16H 61/02 | (2006.01) |
| F16K 37/00 | (2006.01) |
| G01D 11/24 | (2006.01) |

(52) U.S. Cl.
CPC ........ *F02B 77/082* (2013.01); *F04C 29/0014* (2013.01); *F16H 61/0206* (2013.01); *F16K 37/0041* (2013.01); *G01D 11/245* (2013.01); *G01L 19/142* (2013.01); *G01L 19/147* (2013.01)

(58) Field of Classification Search
None
See application file for complete search history.

(56) References Cited

U.S. PATENT DOCUMENTS

| 2010/0186830 | A1 | 7/2010 | Shigyo et al. |
| 2017/0315011 | A1* | 11/2017 | Osawa ............... G01L 19/147 |
| 2018/0038770 | A1* | 2/2018 | Osawa ............... G01M 13/02 |
| 2018/0057355 | A1* | 3/2018 | Osawa ............... B81B 7/0051 |

FOREIGN PATENT DOCUMENTS

| JP | 2010-174991 A | 8/2010 |
| JP | 2011-134801 A | 7/2011 |
| WO | 2010/058800 A1 | 5/2010 |

* cited by examiner

*Primary Examiner* — Andre Allen
(74) *Attorney, Agent, or Firm* — Keating & Bennett, LLP

(57) ABSTRACT

A sensor casing includes a lower case and an upper case that is fixed to an upper part of the lower case. A valve body includes an upper body including an accommodation space in which a sensor casing is disposed and a lower body in which an oil passage is formed. The upper body includes a stopper that prevents downward movement of the oil pressure sensor along a central axis. The sensor casing includes an engagement portion that engages with the stopper to retain the oil pressure sensor in the accommodation space.

5 Claims, 5 Drawing Sheets

SENSOR ATTACHMENT STRUCTURE

CROSS REFERENCE TO RELATED APPLICATIONS

This application claims the benefit of priority to Japanese Patent Application No. 2016-145607 filed on Jul. 25, 2016. The entire contents of this application are hereby incorporated herein by reference.

BACKGROUND OF THE INVENTION

1. Field of the Invention

The present invention relates to a sensor attachment structure that is suitable for use in, for example, a control valve of an automobile transmission.

2. Description of the Related Art

Automatic transmissions of vehicles include a control valve for controlling a transmission mechanism. The control valve controls the transmission mechanism by supplying or stopping supplying a predetermined oil pressure to the transmission mechanism by using a solenoid valve. Some existing control valves include a valve body in which an upper body is superposed on a lower body. An oil passage, in which hydraulic oil flows, is formed in the valve body. A solenoid valve for switching oil pressure and a sensor for detecting oil pressure in the oil passage are disposed in the valve body.

In most existing control valves, electronic devices, such as a sensor, are independently attached onto the valve body. As reduction in size has been needed in recent years, for example, control valves are required to have a built-in structure illustrated in FIG. 8, in which an oil pressure sensor 3 is held between an upper body 1 and a lower body 2. For example, such a structure is described in Japanese Unexamined Patent Application Publication No. 2010-174991, Domestic Re-publication of PCT International Publication for Patent Application No. 2010/058800, and Japanese Unexamined Patent Application Publication No. 2011-134801.

FIG. 9 illustrates a method used in existing technologies to hold the oil pressure sensor 3 between the upper body 1 and the lower body 2. In this method, first, the upper body 1 is turned upside down so that a lower surface thereof faces upward, the oil pressure sensor 3 is turned upside down, and the oil pressure sensor 3 is inserted into an accommodation space 4 in the upper body 1. Next, in a state in which the oil pressure sensor 3 is fitted into the accommodation space 4, the upper body 1 is turned right side up and superposed on the lower body 2, and the upper body 1 and the lower body 2 are fixed to each other.

If the oil pressure sensor 3 is first placed on the lower body 2 and then the upper body 1 is superposed on the lower body 2, the oil pressure sensor 3 and the accommodation space 4 are hidden by the upper body 1, it is difficult to adjust the positions the oil pressure sensor 3 and the accommodation space 4 relative to each other, and it is difficult to insert the oil pressure sensor 3 into the accommodation space 4. Therefore, as described above, the oil pressure sensor 3 is attached to the upper body 1 in a state in which the upper body 1 is turned upside down.

However, with such a method, after the oil pressure sensor 3 has been attached and when the upper body 1 is turned right side up to be superposed on the lower body 2, the oil pressure sensor 3, which has been fitted into the accommodation space 4, may fall due to its own weight. Therefore, an operator needs to superpose the upper body 1 on the lower body 2 to adjust the positions the upper body 1 and the lower body relative to each other while pressing the oil pressure sensor 3 so that the oil pressure sensor 3 may not fall. Thus, this method has a problem of very low workability.

Moreover, there is a probability that the oil pressure sensor 3 becomes damaged, because an operator cannot avoid fall of the oil pressure sensor 3 from the upper body 1 even when the operator pays attention.

SUMMARY OF THE INVENTION

A sensor attachment structure according to an exemplary embodiment of the present invention has the following structure. The sensor attachment structure includes:

(1) an oil pressure sensor including a sensor casing and a pressure detection element disposed in the sensor casing, the oil pressure sensor having a columnar shape and a central axis extending in an up-down direction; and (2) a valve body including an upper body including an accommodation space into which the sensor casing is inserted upward along the central axis, and a lower body through which an oil passage extends toward the upper body.

(3) The upper body includes a stopper that prevents downward movement of the oil pressure sensor along the central axis.

(4) The sensor casing includes an engagement portion that is disposed at a surface thereof and that engages with the stopper to prevent downward movement of the sensor casing along the central axis and to retain the oil pressure sensor in the accommodation space.

(5) In a state in which the sensor casing is disposed in the accommodation space, the engagement portion is elastically deformed toward the central axis, the engagement portion is in contact with the stopper, and downward movement of the sensor casing in a direction along the central axis is prevented.

Preferably, the sensor attachment structure according to the exemplary embodiment of the present invention has any one or any appropriate combination of the following structures.

(1) An elastic portion that extends in the direction along the central axis and that is elastically deformable toward the central axis is disposed at a side wall of the sensor casing, and the elastic portion includes the engagement portion.

(2) The accommodation space is a through-hole formed in the upper body, the stopper is an upper edge of the through-hole, and the engagement portion is a protrusion that contacts the upper edge of the through-hole.

(3) The engagement portion is a recess formed in the elastic portion, the accommodation space is a through-hole formed in the upper body, and the stopper is a protrusion that is formed at an upper edge of the through-hole and that engages with the recess.

(4) The sensor casing includes a lower case and an upper case fixed to an upper part of the lower case; the upper case is made of a resin, and the pressure detection element is disposed in the upper case; the lower case is made of a metal, an oil inlet space that is connected to the oil passage of the lower body is formed in the lower case, and the lower case is held between the upper body and the lower body at a flange portion thereof that is formed at a peripheral edge thereof; and the elastic portion is provided in a part of the resin that forms the upper case.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 8:
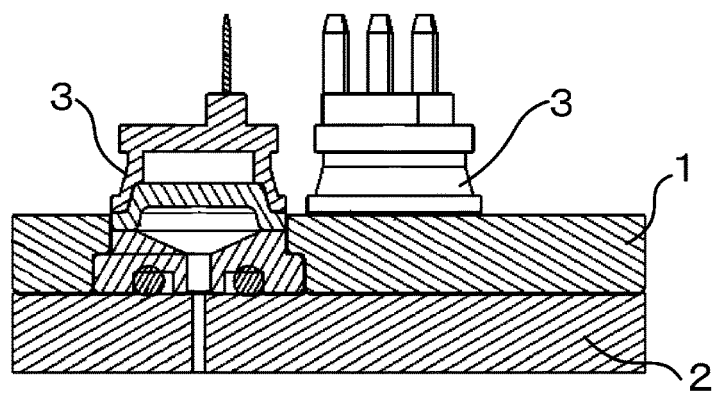
FIG. 8 is a longitudinal sectional view illustrating a state in which an oil pressure sensor is attached to a valve body.
Figure 9:
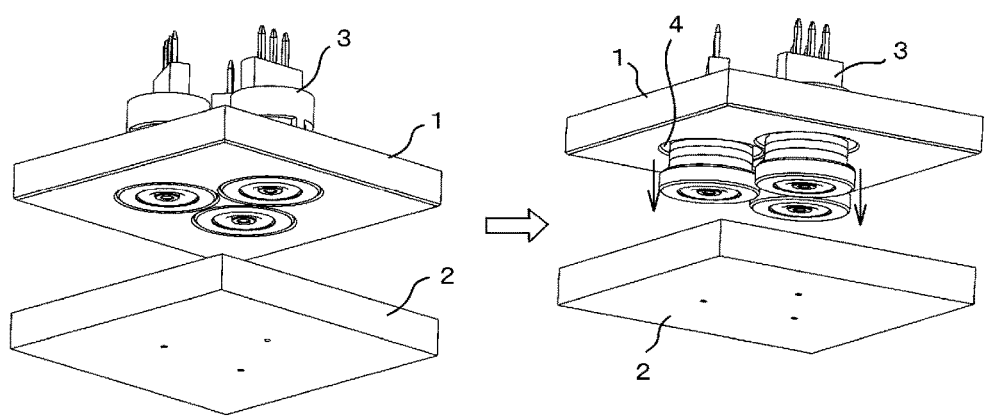
FIG. 9 is a perspective view illustrating a state in which the oil pressure sensor falls from the valve body.

Hereinafter, embodiments of the present invention will be described. In each embodiment, elements that are the same as those of the existing technology shown in FIGS. 8 and 9 will be denoted by the same numerals in the figures and descriptions of such elements will be omitted. In each embodiment, the term "up-down direction" refers to a direction in which the upper body and the lower body are stacked, and the term "axis" refers to the central axis of an oil pressure sensor extending in the up-down direction. Unless otherwise noted, the terms "circumferential direction" and "axial direction" respectively refer to a circumferential direction around the central axis and an axial direction in which the central axis extends.

1. First Embodiment

Figure 1:
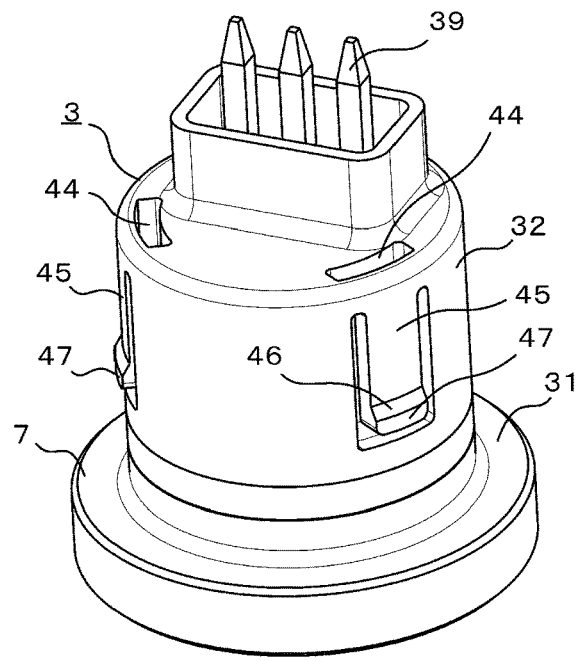
FIG. 1 is a perspective view of a first embodiment.
Figure 2:
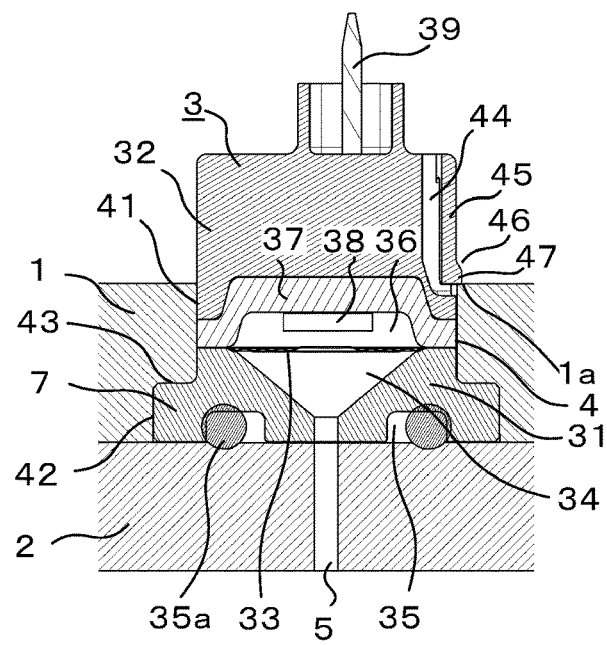
FIG. 2 is a longitudinal sectional view of the first embodiment.

Referring to FIGS. 1 and 2, a first embodiment of the present invention will be described.

A valve body includes an upper body 1 and a lower body 2. The upper body 1 has an accommodation space 4 in which an oil pressure sensor 3 is to be placed. An oil passage 5 extends upward through the lower body 2 toward the upper body 1. The oil pressure sensor 3 is fixed at an opening of the oil passage 5.

A casing of the oil pressure sensor 3 is inserted upward into the accommodation space 4 along the central axis. The accommodation space 4 is a through-hole extending through the upper body 1 from an upper surface to a lower surface of the upper body 1. An upper edge of the through-hole, which is the accommodation space 4, at the upper surface of the upper body 1 is a stopper 1a that prevents downward movement of an engagement portion 47 along the central axis of the oil pressure sensor 3.

The accommodation space 4 includes a small-diameter portion 41 in an upper part thereof. The small-diameter portion 41 has a shape such that the outer peripheral surface of an upper case 32 of the oil pressure sensor 3 can be tightly fitted into the small-diameter portion 41. A horizontal cross section of the small-diameter portion 41, that is, a cross section of the small-diameter portion 41 that is perpendicular to the axis of the oil pressure sensor 3 is smaller than a horizontal cross section of a lower case 31 of the oil pressure sensor 3. Therefore, the lower case 31 cannot enter the small-diameter portion 41. The accommodation space 4 includes a large-diameter portion 42 in a lower part thereof. An outer peripheral surface of the lower case 31, that is, a flange portion 7 of the lower case 31 is fitted into the large-diameter portion 42. A step portion 43 is formed at the boundary between the small-diameter portion 41 and the large-diameter portion 42.

The oil pressure sensor 3 is a columnar member having a central axis extending in the up-down direction. The oil pressure sensor includes the lower case 31 and the upper case 32 fixed to an upper part of the lower case 31. The lower case 31 and the upper case 32 correspond to a sensor casing in the present invention. An outer periphery of the lower case 31 extends beyond the outer periphery of the upper case 32 outward in the radial direction, that is, the horizontal direction in the figures and forms the flange portion 7.

An oil inlet space 34 is formed in the lower case 31. One end portion of the oil inlet space 34 opens to the oil passage 5. The other end portion of the oil inlet space 34 is covered by a flexible plate 33 that is deformable in accordance with oil pressure. A groove 35 is formed in a portion of the lower case 31 outside of the oil passage 5 in the radial direction. The groove 35 is recessed upward from the lower surface of the lower case 31. A sealing member 35a, which is an O-ring or the like, is fitted into the groove 35. The sealing member 35a seals a contact surface between the lower case 31 and the lower body 2.

A pressure detection space 36, which surrounds an upper side of the flexible plate 33, is formed in the upper case 32. A support member 37, whose periphery is fixed to the upper case 32, is disposed in the pressure detection space 36. A pressure detection element 38 is disposed on a lower surface of the support member 37. The pressure detection element 38 is disposed on a side of the flexible plate 33 opposite to a side on which the oil inlet space 34 is located. When the flexible plate 33 becomes deformed due to oil pressure from the oil passage 5, the flexible plate 33 contacts the pressure detection element 38.

Terminal pins 39, which have spring-like elasticity and are connected to the pressure detection element 38, are attached to the upper case 32. The terminal pins 39 are connected to a printed circuit board (not shown). An upper part of the upper case 32 and the terminal pins 39, which are attached to the upper part, protrude from the accommodation space 4 of the upper body 1 and are exposed from the upper surface of the upper body 1.

Recesses 44 are formed at regular intervals in the surface of the upper case 32 so as to each extend in the axial direction. An elastic member 45 is disposed in each of the recesses 44. The elastic member 45 engages with the stopper 1a of the upper body 1 to prevent downward movement of the oil pressure sensor 3 along the central axis and to retain the oil pressure sensor 3 in the accommodation space 4. An upper part of the elastic member 45 is fixed to a wall surface of the upper case 32 at an upper end of the recess 44. A lower part of the elastic member 45 is disposed at a distance from a wall surface of the recess 44. The lower pat of the elastic member 45 is elastically deformable toward the central axis of the oil pressure sensor 3.

The engagement portion 47, which protrudes in a direction outward from the central axis, is disposed at a lower end of the elastic member 45. In a state in which the oil pressure sensor 3 is placed in the accommodation space 4, the engagement portion 47 is in contact with the stopper 1a of the upper body 1 and prevents downward movement of the oil pressure sensor 3 along the central axis.

An outer peripheral surface of a lower end portion of the elastic member 45 includes an inclined surface 46 that is inclined outward and downward along the elastic member 45. In a state in which the elastic member 45 is not elastically deformed toward the central axis of the oil pressure sensor 3, the engagement portion 47 at the lower end of the elastic member 45 is located outside of an upper opening of the accommodation space 4 as seen from the central axis, that is, outside of an edge of the stopper 1a of the upper body 1 closer to the central axis.

The first embodiment, which has the structure described above, has the following advantageous effects.

When attaching the oil pressure sensor 3 to the upper body 1, the upper body 1 is turned upside down and the oil pressure sensor 3 is inserted into the accommodation space 4 by first inserting the terminal pins 39. Then, each of the elastic members 45, which is at the outer peripheral surface of the upper case 32, deforms toward the central axis of the oil pressure sensor 3 due to the elasticity thereof. At this time, an edge of the accommodation space 4 presses the inclined surface 46 of the elastic member 45. Therefore, the elastic member 45 can smoothly deform toward the central axis of the oil pressure sensor 3 without becoming caught on the edge of the accommodation space 4. As a result, the oil pressure sensor 3 can be easily inserted into the accommodation space 4.

When the oil pressure sensor 3 has been completely inserted into the accommodation space 4, the lower end of the elastic member 45 passes through the accommodation space 4 and emerges to the surface of the upper body 1. Then, the elastic member 45 expands outward from the central axis due to the elasticity thereof, and the engagement portion 47 at the lower end of the elastic member 45 engages with the stopper 1a of the surface of the upper body 1. At the same time, the upper case 32 is placed in the small-diameter portion 41 of the accommodation space 4, and the lower case 31 is placed in the large-diameter portion 42 of the accommodation space 4. Therefore, the oil pressure sensor 3 is held between the engagement portion 47 and the step portion 43 and retained in the accommodation space 4.

After the oil pressure sensor 3 has been temporarily attached to the upper body 1 in this way, the upper body 1 is turned right side up and superposed on the upper surface of the lower body 2, and the upper body 1 and the lower body 2 are fixed to each other. Since the oil pressure sensor 3 has been temporarily attached to the upper body 1, the oil pressure sensor 3 does not fall from the lower surface of the upper body 1.

When the upper body 1 and the lower body 2 are fixed to each other, the flange portion 7 of the lower case 31 of the oil pressure sensor 3 is held between the step portion 43 of the upper body 1 and the surface of the lower body 2. As a result, even if the stopper 1a and the engagement portion 47 become disengaged, the oil pressure sensor 3 is fixed between the upper body 1 and the lower body 2.

With the engagement portion 47 and the stopper 1a, which retain the oil pressure sensor 3 in the accommodation space 4, it is possible to prevent fall of the oil pressure sensor 3 from the upper body 1 in an operation step before the oil pressure sensor 3 is fixed in a space between the upper and lower bodies 1 and 2 of the control valve to form a built-in structure.

As a result, it is possible to prevent breakage of the oil pressure sensor 3, to simplify an assembling operation in the manufacturing process, and to improve the productivity.

Since the engagement portion 47 of the elastic member 45 of the oil pressure sensor 3 elastically deforms and engages with the stopper 1a of the valve body, it is easy to temporarily fix the oil pressure sensor 3 to the upper body 1. Since the upper case 32 is made from a material that is thin and easily deformable compared with the valve body, it is easy to form the elastic member 45 including the engagement portion 47.

The edge of the accommodation space 4, which is an opening formed in the upper body 1, is used as the stopper 1a. Therefore, when forming the accommodation space 4 in the valve body, it is not particularly necessary to machine the inner surface or the like of the accommodation space 4 so as to form recesses/protrusions.

Since the flange portion 7 extends along the entire periphery of the lower case 31, the flange portion 7 has a large area and can receive a pressing force of the upper body 1 with the large area. Therefore, it is possible to reliably fix the lower case 31. In particular, since the upper case 32 is made of a resin, it is easy to form the elastic member 45. By forming the lower case 31, which is to be held between the upper and lower bodies, from a metal having high strength, it is possible to securely fix the lower case 31 between the upper and lower bodies.

The accommodation space 4 of the upper body 1 is a through-hole, and a part of the elastic member 45 is exposed from the upper surface of the upper body 1. Therefore, it is possible to disengage the engagement portion 47 from the stopper 1a by pushing the elastic member 45 toward the central axis. As a result, it is easy to remove the oil pressure sensor 3, which has been temporarily fixed, from the upper body 1.

2. Second Embodiment

Figure 3:
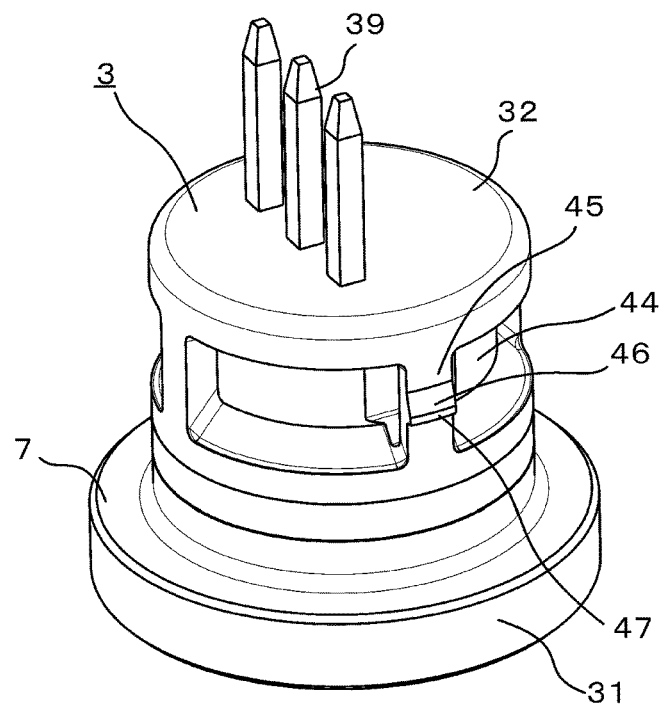
FIG. 3 is a perspective view of a second embodiment.
Figure 4:
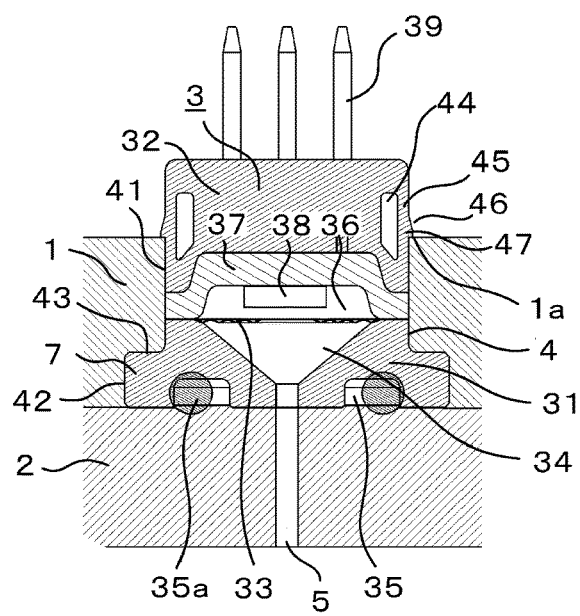
FIG. 4 is a longitudinal sectional view of the second embodiment.

Referring to FIGS. 3 and 4, a second embodiment of the present invention will be described. Elements of the second embodiment that are the same as those of the first embodiment will be denoted by the same numerals and descriptions of such elements will be omitted.

In the second embodiment, an annular recess 44 that extends in the circumferential direction is formed along the entire outer peripheral surface of an upper case 32. Three elastic members 45 are disposed at regular intervals so as to bridge the annular recess 44 in the up-down direction along the central axis. Upper and lower ends of the elastic members 45 are fixed to the surface of the upper case 32. Each of the elastic members 45 is made of an appropriate material and has an appropriate thickness such that a central part of the elastic member 45 in the up-down direction along the central axis can elastically deform so that the central part moves toward and away from the central axis. An engagement portion 47 and an inclined surface 46 are formed at substantially the central part of each of the elastic members 45 in the up-down direction so as to protrude outward as seen from the central axis.

Also with the second embodiment, when an oil pressure sensor 3 is inserted into an accommodation space 4, the engagement portions 47 engage with the stopper 1a, and the oil pressure sensor 3 is prevented from falling from an upper body 1. As a result, the second embodiment has the same advantageous effects as the first embodiment. Moreover, with the second embodiment, since both ends of the elastic members 45 are fixed to the upper case 32, end portions of the elastic members 45 are prevented from sticking out and becoming caught on another member. Therefore, it is easy to handle the oil pressure sensor 3.

3. Third Embodiment

Figure 5:
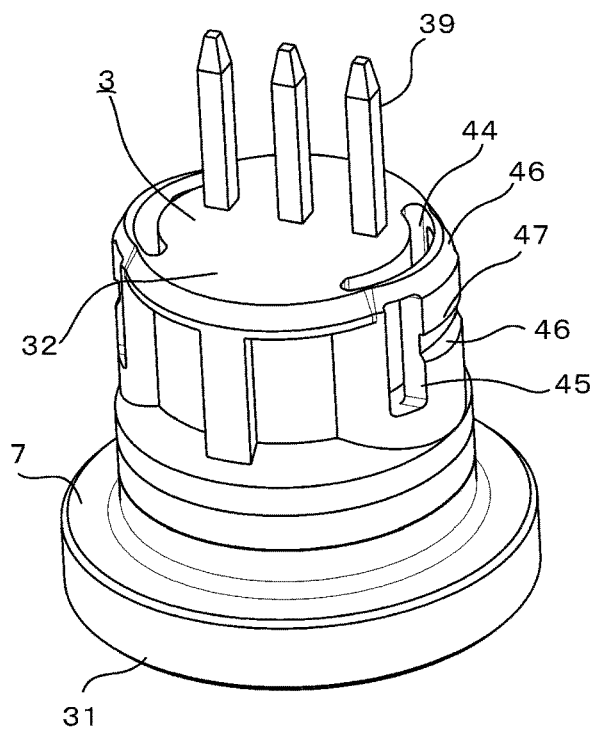
FIG. 5 is a perspective view of a third embodiment.
Figure 6:
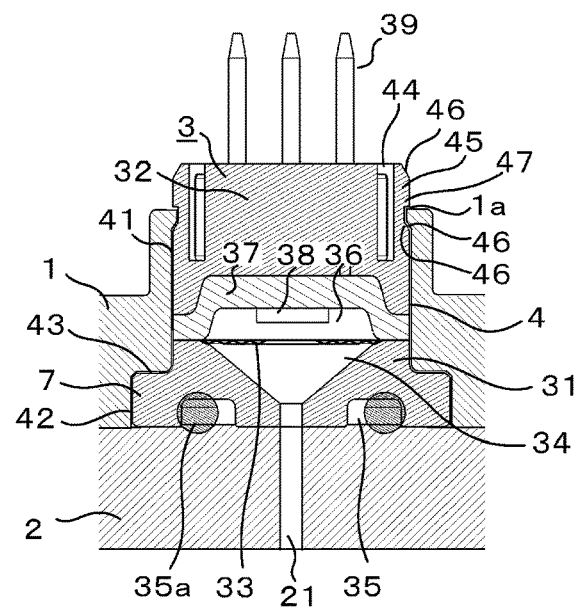
FIG. 6 is a longitudinal sectional view of the third embodiment.

Referring to FIGS. 5 and 6, a third embodiment of the present invention will be described. Elements of the third embodiment that are the same as those of the first embodiment will be denoted by the same numerals and descriptions of such elements will be omitted.

In the third embodiment, a stopper 1a of an upper body 1 is a protrusion that protrudes toward the central axis of an oil pressure sensor 3 from an upper edge portion of a through-hole that is an accommodation space 4. Elastic members 45, whose lower ends are fixed to the upper case 32, are formed in the upper case 32. A recess that is recessed toward the central axis is formed in an outer peripheral surface of each of the elastic members 45, and the recess is an engagement portion 47.

An inclined surface 46 is formed in each of an outer peripheral surface of an upper part of the elastic member 45, a lower part of the engagement portion 47, and a lower part of the stopper 1a. The inclined surface 46 of the outer peripheral surface of the upper part of the elastic member 45 serves as a guide surface that guides the oil pressure sensor 3 when inserting the oil pressure sensor 3 into the accommodation space 4. The inclined surface 46 in the lower part of the engagement portion 47 and the inclined surface 46 in the lower part of the stopper 1a serve as guide surfaces when engaging the engagement portion 47 with the stopper 1a.

Figure 7:
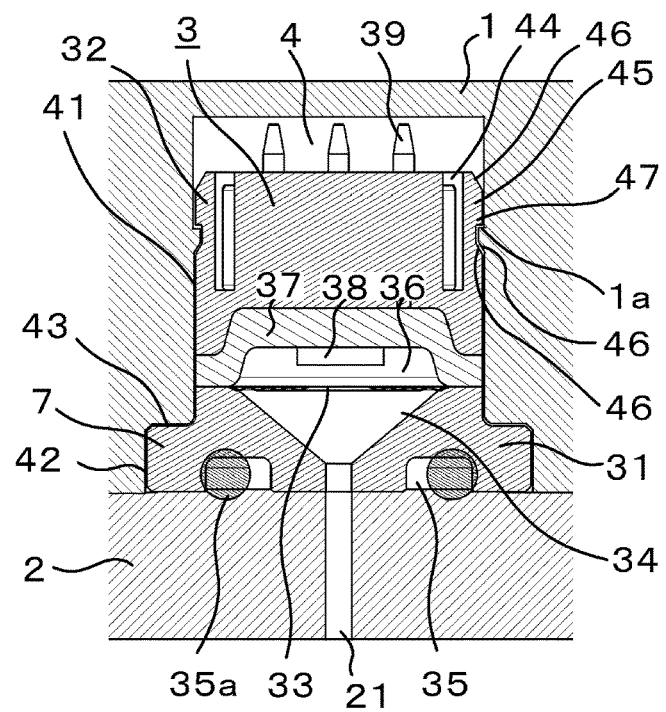
FIG. 7 is a longitudinal sectional view of a modification of the third embodiment.

Also with the third embodiment, when the oil pressure sensor 3 is inserted into the accommodation space 4, the engagement portions 47 engage with the stopper 1a, and the oil pressure sensor 3 is prevented from falling from the upper body 1. As a result, the third embodiment has advantageous effects that are the same as those of the first embodiment. Moreover, with the third embodiment, the stopper 1a protrudes toward the central axis of the accommodation space 4. Therefore, the stopper 1a need not be disposed at an edge of a through-hole that is the accommodation space 4. For example, the stopper 1a may be formed at a middle part of the through-hole. In this case, even if the upper part of the accommodation space 4 is closed as illustrated in FIG. 7, it is possible to temporarily fix the oil pressure sensor 3.

4. Other Embodiments

The present invention is not limited to the embodiments described above. The embodiments are examples and the present invention can be embodied in various other forms. Some elements may be omitted, replaced, or modified in various ways within the scope of the invention. The embodiments and modifications of the embodiments are included in the scope, gist, and equivalents of the invention. Examples of the modifications are as follows.

(1) The structure of the oil pressure sensor 3 is not limited to those of the embodiments shown in the figures. The elastic member may be located in the lower case 31 instead of the upper case 32.

(2) The materials of the upper case 32 and the lower case 31 are not limited to those of the embodiments shown in the figures. The upper case 32 may be made of a metal instead of a resin, as long as an elastic member and an engagement portion can be formed in the upper case 32. The lower case 31 may be made of a resin.

(3) The flange portion 7 of the lower case 31 need not have a flange-like shape extending around the entire periphery of the lower case 31. Protrusions may be formed on the periphery of the lower case 31 at regular intervals or at appropriate intervals, and the upper surfaces of the protrusions may be used as the flange portion 7.

(4) The elastic member 45, including the engagement portion 47, need not be fixed to the sensor casing. The elastic member 45 may be independent from the sensor casing and may be fixed to the sensor casing by screwing, fitting, or adhesive bonding.

(5) A low-profile, so-called button-type oil pressure sensor may be used as a columnar sensor having a central axis in the present invention. In this case, as illustrated in FIG. 7, the accommodation space 4 may be a recess formed in the lower surface of the upper body 1.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sensor attachment structure comprising:
   an oil pressure sensor including a sensor casing and a pressure detection element disposed in the sensor casing, the oil pressure sensor having a columnar shape and a central axis extending in an up-down direction; and
   a valve body including
   an upper body including an accommodation space into which the sensor casing is inserted upward along the central axis, and
   a lower body through which an oil passage extends toward the upper body,
   wherein the upper body includes a stopper that prevents downward movement of the oil pressure sensor along the central axis,
   wherein the sensor casing includes an engagement portion that is disposed at a surface thereof and that engages with the stopper to prevent downward movement of the sensor casing along the central axis and to retain the oil pressure sensor in the accommodation space, and
   wherein, in a state in which the sensor casing is disposed in the accommodation space, the engagement portion is elastically deformed toward the central axis, the engagement portion is in contact with the stopper, and downward movement of the sensor casing in a direction along the central axis is prevented.

2. The sensor attachment structure according to claim 1, wherein an elastic portion that extends in the direction along the central axis and that is elastically deformable toward the central axis is disposed at a side wall of the sensor casing, and
   wherein the elastic portion includes the engagement portion.

3. The sensor attachment structure according to claim 2, wherein the accommodation space is a through-hole formed in the upper body,
   wherein the stopper is an upper edge of the through-hole, and
   wherein the engagement portion is a protrusion that contacts the upper edge of the through-hole.

4. The sensor attachment structure according to claim 2,
wherein the engagement portion is a recess formed in the elastic portion,
wherein the accommodation space is a through-hole formed in the upper body, and
wherein the stopper is a protrusion that is formed at an upper edge of the through-hole and that engages with the recess.

5. The sensor attachment structure according to claim 2,
wherein the sensor casing includes a lower case and an upper case fixed to an upper part of the lower case,
wherein the upper case is made of a resin, and the pressure detection element is disposed in the upper case,
wherein the lower case is made of a metal, an oil inlet space that is connected to the oil passage of the lower body is formed in the lower case, and the lower case is held between the upper body and the lower body at a flange portion thereof that is formed at a peripheral edge thereof, and
wherein the elastic portion is provided in a part of the resin that forms the upper case.

* * * * *